Dec. 14, 1926.

S. RUBEN 1,610,971

ELECTROCHEMICAL TESTING DEVICE

Filed June 1, 1921

Inventor
Samuel Ruben.

By Robert Watson

Attorney

Patented Dec. 14, 1926.

UNITED STATES PATENT OFFICE.

SAMUEL RUBEN, OF NEW YORK, N. Y.

ELECTROCHEMICAL TESTING DEVICE.

Application filed June 1, 1921. Serial No. 474,156.

This invention relates to apparatus for testing the electrical properties of various substances, particularly liquids, by means of which other properties, such as the acidity of a liquid, can be determined. In carrying out the invention, I provide a primary coil which is connected to a source of high frequency currents and a secondary coil, inductively or conductively related to the primary coil, and connected in a local circuit containing an ammeter, and I also provide a vessel of non-conductive material, such as a glass flask, for containing the substance whose electrical properties are to be determined, this flask being adapted to fit into or onto the primary coil, and being shaped to suit the form of the coil and to hold the substance in a relatively thin layer parallel with the windings of the coil. The high frequency current in the primary coil induces a current of like character in the secondary coil, which is indicated on the meter. The volume of current in the secondary circuit will vary according to the conductivity of the material in the vessel. If this material is not conductive, it will have no effect upon the current in the secondary circuit; but if the material is conductive, current will be induced in it by the primary coil and the inductive energy of the primary coil will be divided between the material in the vessel and the secondary coil so that the reading on the meter will be lower if material under test has good conductive properties and higher if the material has poor conductive properties.

Referring to the drawing.

Figure 1:
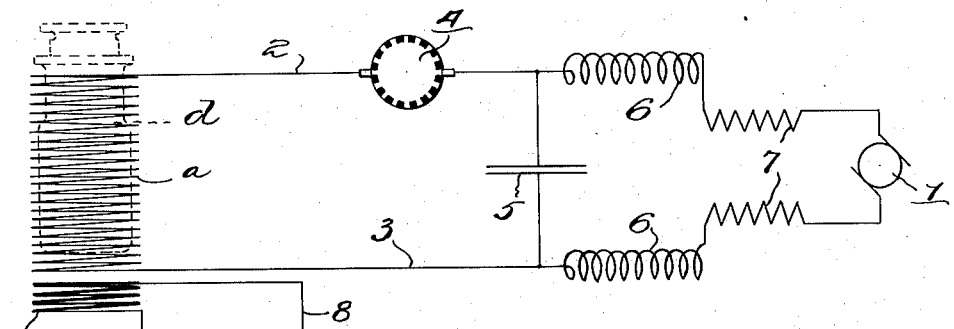
Fig. 1 is a diagrammatic view showing one form of the invention in which the primary and secondary coils are inductively related.

Referring to Fig. 1 of the drawing, $a$ represents an inductance coil, the terminals of which are connected to a source of oscillating current, and $b$ indicates a secondary coil, having a fewer numbers of turns, arranged in inductive relation to the coil $a$. I have shown the current source as comprising a direct current generator 1, connected through conductors 2 and 3, to terminals of the inductance coil $a$, and in order to produce the oscillating current, I arrange in one of the conductors a rotary interrupter 4, and arrange a condenser 5 across the line 2—3, between the interrupter and the generator. With this arrangement, an oscillating discharge through the inductance coil takes place each time the circuit is made at the interrupter. Inductances 6 and resistances 7 are arranged between the condenser and the generator to protect the generator from the condenser discharges and from short circuits. An integrating ammeter $c$ is arranged in a secondary circuit 8, which includes the coil $b$, and an adjustable condenser 9 is arranged in said circuit, for tuning the meter circuit to the frequency of the oscillations in the primary circuit.

Figure 3:
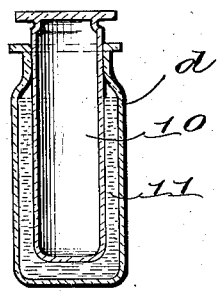

In Fig. 3, I have shown a receptacle adapted to fit within the coil $a$ and to contain the substance whose conductivity is to be measured. This receptacle comprises a jar or flask $d$, of non-conducting material, having a core 10, filling the central portion of the flask and leaving a space 11 between the wall of the flask and the core within which the material to be tested will be spread out in a comparatively thin layer.

In operation, the material whose conductivity is to be measured is placed within the container and the latter is placed within the inductance coil $a$. The oscillating current in said coil will cause a similar current to be induced in the secondary circuit, and the volume of this currrent will be indicated on the meter $c$. Current will also be induced in the conductive material within the receptacle $d$ and this current will vary proportionately to the conductivity of said material. The energy absorbed by the conductive material in the receptacle will have the effect of lessening the current induced in the secondary coil, proportionately, so that the meter will give an indication of the energy absorbed by the conductive material in the receptacle, and therefore of its conductivity.

Figure 2:
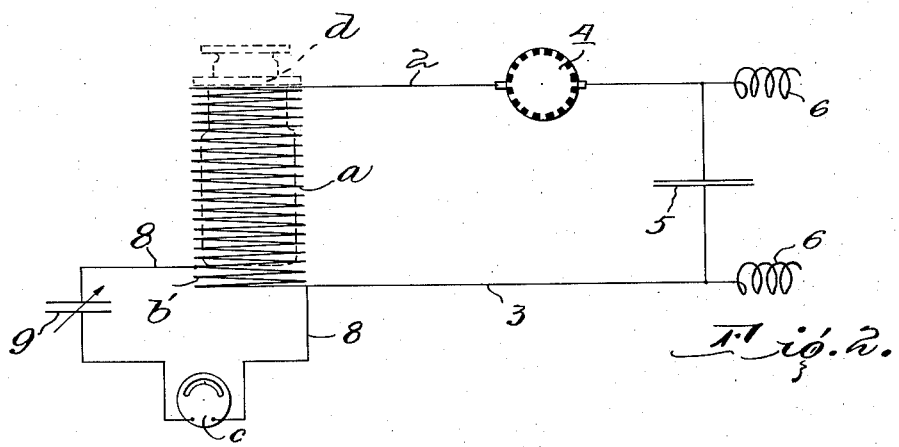
Fig. 2 is a similar view showing an arrangement in which the primary and secondary coils are inductively and conductively related; and, Fig. 3 is a central vertical section through a receptacle for containing the material whose conductivity is to be measured.

In Fig. 2, I have shown an arrangement similar to that illustrated in Fig. 1, but in Fig. 2, a part $b'$ of the inductance coil $a$ is connected in the secondary circuit, the coils thus being inductively and conductively related. The action is substantially the same as in Fig. 1. When the flask containing the material whose conductivity is to be tested is placed within the coil $a$, the meter in the secondary circuit will indicate the conductivity of the substance in the receptacle.

The coils may be helical in form, or they may be made in the form of flat spirals. Thus, when the vessel containing the substance whose conductivity is to be measured is flat or dish-like, the coils will be flat and the vessel may be placed directly upon the primary coil.

What I claim is:

1. An apparatus for indicating the conductive properties of various substances, comprising a source of oscillating currents, a circuit, including a primary coil, connected to said source, a non-inductive container for holding the substance in inductive relation to said coil, a secondary circuit tuned to the frequency of the primary circuit and containing a secondary coil which is inductively related to the primary coil, and a meter in the secondary circuit.

2. An apparatus for indicating the conductive properties of various substances, comprising a source of oscillating currents, a circuit, including a primary coil, connected to said source, a non-inductive container for holding the substance in inductive relation to said coil, a secondary circuit tuned to the frequency of the primary circuit and containing a secondary coil which is inductively and conductively related to the primary coil, and a meter in the secondary circuit.

3. An apparatus for indicating the conductive properties of various substances, comprising a source of oscillating currents, a circuit, including a primary coil, connected to said source, a non-inductive container adapted to hold the substance in a relatively thin layer in inductive relation to said coil, a secondary circuit tuned to the frequency of the primary circuit and containing a secondary coil which is inductively related to the primary coil, and a meter in the secondary circuit.

4. An apparatus for indicating the conductive properties of various substances, comprising a source of oscillating currents, a circuit, including a primary coil, connected to said source, a non-inductive container adapted to hold the substance in inductive relation to said coil and parallel with its windings, a secondary circuit tuned to the frequency of the primary circuit and containing a secondary coil which is inductively related to the primary coil, and a meter in the secondary circuit.

5. An apparatus for indicating the conductive properties of various substances, comprising a primary coil connected to a suitable source of oscillating currents, a non-conductive container for holding the substance in inductive relation to said coil, said container comprising a flask having a central core and said core forming, with the wall of the flask, an annular chamber, a secondary coil inductively related to the primary coil, and a meter connected to said secondary coil.

In testimony whereof I affix my signature.

SAMUEL RUBEN.